United States Patent
Ober et al.

(10) Patent No.: US 6,654,465 B2
(45) Date of Patent: *Nov. 25, 2003

(54) METHOD OF IMPLEMENTING A KEY RECOVERY SYSTEM

(75) Inventors: Timothy Ober, Atkinson, NH (US); Peter Reed, Beverly, MA (US)

(73) Assignee: SafeNet, Inc., Baltimore, MD (US)

( * ) Notice: Subject to any disclaimer, the term of this patent is extended or adjusted under 35 U.S.C. 154(b) by 301 days.

This patent is subject to a terminal disclaimer.

(21) Appl. No.: 09/897,251

(22) Filed: Jul. 2, 2001

(65) Prior Publication Data

US 2001/0036276 A1 Nov. 1, 2001

Related U.S. Application Data

(63) Continuation of application No. 09/154,120, filed on Sep. 16, 1998, now Pat. No. 6,278,782.
(60) Provisional application No. 60/059,082, filed on Sep. 16, 1997, and provisional application No. 60/059,845, filed on Sep. 16, 1997.

(51) Int. Cl.[7] .................................................. H04L 9/32
(52) U.S. Cl. ........................ 380/264; 380/286; 380/44; 713/176
(58) Field of Search .................................... 380/273, 44

(56) References Cited

U.S. PATENT DOCUMENTS

| | | | |
|---|---|---|---|
| 4,987,595 A | 1/1991 | Marino, Jr. et al. | 380/50 |
| 5,448,045 A | 9/1995 | Clark | 380/50 |
| 5,539,828 A | 7/1996 | Davis | 380/23 |
| 5,557,346 A | 9/1996 | Lipner et al. | 380/21 |
| 5,623,545 A | 4/1997 | Childs et al. | 380/2 |
| 5,631,960 A | 5/1997 | Likens et al. | 380/2 |
| 5,721,777 A | 2/1998 | Blaze | 235/382 |
| 5,857,022 A | 1/1999 | Sudia | 380/4 |
| 6,278,782 B1 * | 8/2001 | Ober et al. | 380/264 |

* cited by examiner

Primary Examiner—Albert Decady
Assistant Examiner—Todd M Jack
(74) Attorney, Agent, or Firm—Gerald T. Bodner

(57) ABSTRACT

A method of generating a recovery key encryption key (RKEK) in a secure manner by an integrated circuit (IC) and a key recovery escrow agent includes the steps of generating by the IC a first number having a private component and a public component, and generating by the escrow agent a second number having a private component and a public component. The public component of the first number is provided to the escrow agent, and the public component of the second number is provided to the integrated circuit. A Diffie-Hellman modulo-exponentiation mathematical operation is performed by the integrated circuit using the private component of the first number, the public component of the first number and the public component of the second number to create the RKEK. A similar operation is performed by the escrow agent using the private component of the second number, the public number of the second number and the public component of the first number to create the RKEK at its end.

5 Claims, 1 Drawing Sheet

KEY RECOVERY FLOW DIAGRAM

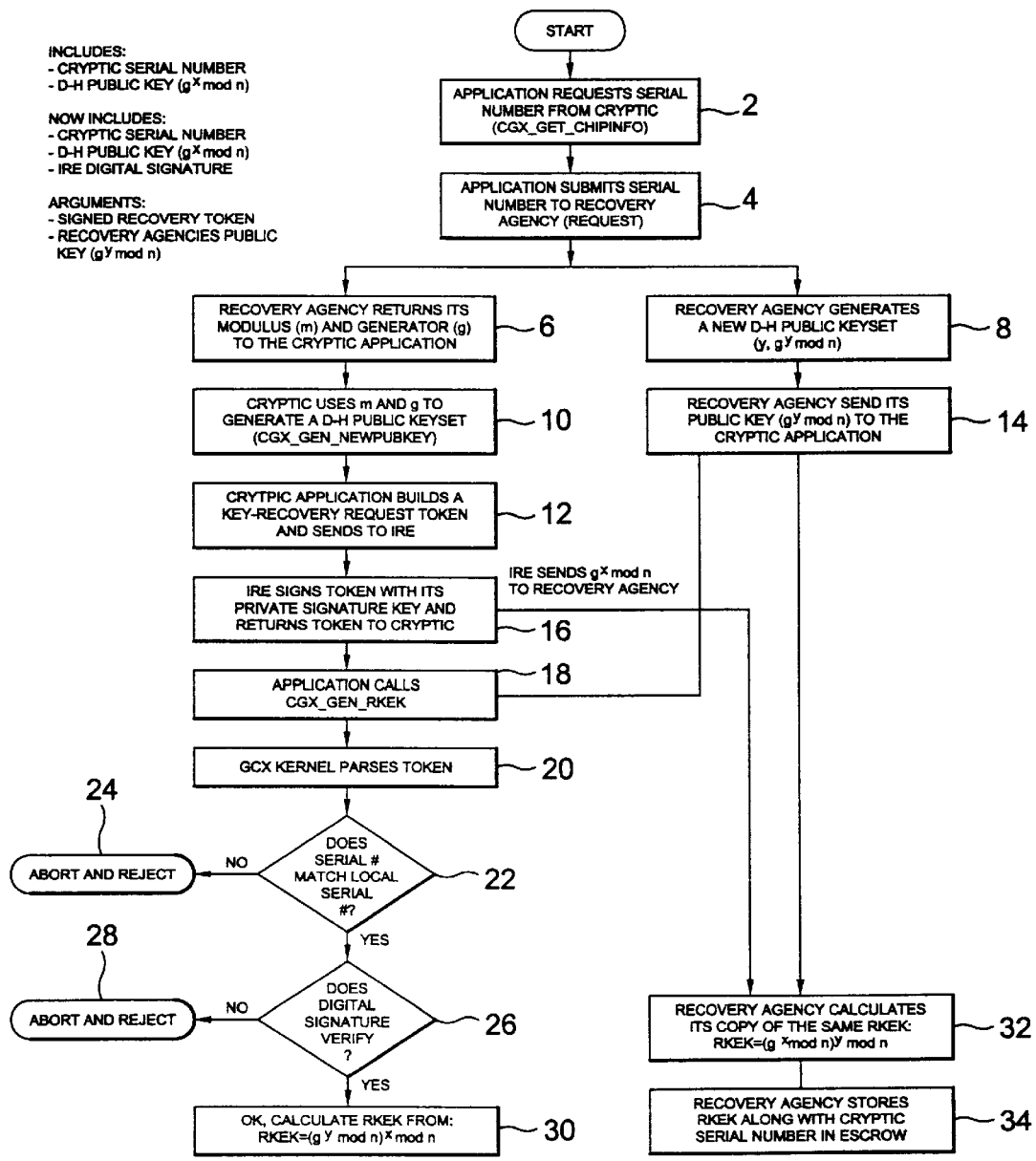

METHOD OF IMPLEMENTING A KEY RECOVERY SYSTEM

CROSS-REFERENCE TO RELATED APPLICATIONS

This application is a continuation of application Ser. No. 09/154,120, filed on Sep. 16, 1998, now U.S. Pat. No. 6,278,782 and is based on Provisional Patent Application Serial Nos. 60/059,082 and 60/059,845, each of which was filed on Sep. 16, 1997, and relates to U.S. patent application Ser. No. 09/154,443 flied on Sep. 16, 1998, now U.S. Pat. No. 6,278,782, which issued on Aug. 21, 2001, the disclosures of which are incorporated herein by reference.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates generally to a method of encryption key recovery on an integrated circuit, and more particularly relates to a method of establishing a trusted key relationship with an authorized party which allows a user to recover an encryption key in a secure manner.

2. Description of the Prior Art

Key recovery is typically used to retrieve a copy of a private key when the key is lost, or is unknown to an employer, or when a court order has granted a government agency the right to monitor communication traffic. A lost key results in lost data because without the key, the encrypted data cannot be decrypted. A disk holding the key may be lost or a hardware failure may result in a lost key. A user needs to have the ability to recover a lost key. An employer may need to recover private keys generated by former or disgruntled employees to retrieve corporate information. A government authority may need a private key to observe an encrypted data transmission when there is a suspicion of criminal activity. The typical method of key recovery includes sending a wrapped copy of the private key with each transmission. Then under the appropriate circumstances, this key may be unwrapped with a recovery key.

OBJECTS AND SUMMARY OF THE INVENTION

It is an object of the present invention to provide a method of creating a recovery key encryption key (RKEK) in a secure manner so that only an authorized party can own the RKEK.

It is another object of the present invention to create an RKEK for wrapping keys used in an encryption process, and for recovering the encryption key and decrypting data at a later date.

In accordance with one form of the present invention, a method of generating a recovery key encryption key (RKEK) in a secure manner by an integrated circuit (IC) and a key recovery escrow agent includes the steps of generating by the IC a first number having a private component and a public component, and generating by the escrow agent a second number having a private component and a public component. The method further includes the steps of providing the public component of the first number to the escrow agent, and providing the public component of the second number to the IC.

Then, a Diffie-Hellman modulo-exponentiation mathematical operation is performed by the IC using the private component of the first number, and the public component of the second number to create the RKEK. Also, the escrow agent performs a similar operation, that is, a Diffie-Hellman modulo-exponentiation mathematical operation using the private component of the second number, and the public component of the first number to create the RKEK at its end.

These and other objects, features and advantages of the present invention will become apparent from the following detailed description of illustrative embodiments thereof, which is to be read in connection with the accompanying drawing.

BRIEF DESCRIPTION OF THE DRAWING

The FIGURE is a flowchart of a method in accordance with the present invention for creating a secure recovery key encryption key.

DETAILED DESCRIPTION OF THE PREFERRED EMBODIMENTS

The following technique describes an approach for encryption key recovery that meets the needs of both the government and users. It provides a way for an application program to establish a trusted key relationship (a secure protocol) with a third party, such as an integrated circuit (IC) manufacturer or a certifying/escrow agency, so that a recovery key encryption key (RKEK) can be created. This provides the escrow agency with the means to get at any key created/protected by the IC.

In accordance with one form of the present invention, a random number is burned into a read only memory (ROM) on the integrated circuit (IC) by the manufacturer of the chip. This random number is a unique serial number which is used to identify the chip.

With respect to key recovery, the purpose is to have the recovery key encryption key (RKEK) embedded in the IC and used as part of the normal encryption routines performed by the chip. The RKEK is used to wrap or encrypt other keys used in the encryption process. One always wants to ultimately protect the keys used in encryption, and would never want to let keys be exported outside the chip, except keys that will be allowed to leave the chip if they are protected by the RKEK.

The RKEK will be embedded in the chip, but also the idea is to have someone else have a copy of the RKEK, i.e., the escrow agent or the "key recovery agent". This will allow someone else (other than the chip, or more precisely, the OEM manufacturer in whose end product (e.g., router, modem, cellular phone, etc) the chip is found) to decrypt the data or recover the key used in the encryption process.

First, the RKEK must be generated and it is preferably stored on the chip in a key cache register. The RKEK is a key that is in the IC which is used to "wrap" other keys used in the encryption process. Once one has created an RKEK in the chip, one wants to create a carbon copy of it for the escrow agent to hold.

The OEM product manufacturer, who manufactures a device, such as a router or modem in which the encryption chip is used, usually has an agreement with an escrow agent. The escrow agent and the OEM manufacturer agree on the modulus and generator used by the chip. The modulus and generator are public elements (i.e., numbers) used in public key cryptography. If two parties want to take part in a public key operation, including creating the RKEK, then the parties must agree on the modulus and generator so that the two parties will be, in effect, communicating in the same language. Once the OEM product manufacturer and the escrow agent have decided on the modulus and generator used in the chip, the application software uses a command, such as CGX_GEN_NEWPUBKEY, to begin the process of generating a public key.

In generating a public key, the chip preferably uses a Diffie-Hellman (D-H) public key process, although one can use RSA, elliptic curve and other well-known public key algorithm techniques. The following explanation of the RKEK process will be described using the Diffie-Hellman (D-H) public key method. The D-H public key method is preferred over elliptic curve and RSA for generating the RKEK because each party contributes equally to the generation of the RKEK and no one party has an advantage over the other.

With the D-H public key method, each party to the communication will end up having a key (i.e., a relatively long number) which will be the same. Each party starts out with its own number that it chooses. The number has a private component and a public component. Each party exchanges (reveals to the other) its public component. In the case of generating the RKEK, one party is the OEM product manufacturer in whose product the encryption chip is used, and the other party is the escrow agent. After the exchange, each party ends up having its own private part, its own public part and the other party's public part.

In accordance with the D-H method, a mathematical operation (modulo-exponentiation arithmetic) is performed by each party, using an exponential formula ($g^{xy}$ mod n). By using this mathematical operation on the private components and the known public components, each party can derive the same number (key). An outsider (eavesdropper) to the communication has only access to the two public parts and neither private part and, therefore, is denied access to the key.

With the command, CGX_GEN_NEWPUBKEY, the IC will create a number having a private part and a public part. The escrow agent does the same. The private part stays protected on the chip; it never leaves the chip. The escrow agent's number also has a private part and a public part (the escrow agent carefully holds in confidence the private part). The numbers are generated by both parties using the D-H modulus and generator.

Now, the IC generates a request token (i.e., message) to generate an RKEK. In the token is preferably repeated the unique serial number of the chip and the public part of the D-H key set (and optionally a hash of this data for integrity purposes). This request token is preferably sent to the chip manufacturer (i.e., a trusted third party), which acts as a middleman between the OEM part manufacturer (whose product uses the IC) and the key escrow agent.

Thus, the manufacturer of the IC has the public component of the IC's key, and the serial number. The manufacturer recognizes the chip from the serial number and may verify with the escrow agent that a key recovery process has been agreed to between the OEM product manufacturer and the agent. The IC manufacturer then authorizes the creation of the RKEK.

Preferably, the chip will not be able to create the RKEK without the chip manufacturer's authorization. Using the chip manufacturer as the middleman to give approval to create the RKEK adds an extra measure of security to further preclude an unauthorized adversary from creating an RKEK that may be used to decrypt data and uncover the encryption key.

The chip manufacturer "signs" the request token by adding its digital signature using a private key. The signed token, which preferably comprises the serial number (of the chip), the public component (referred to as "$g^x$ mod n") of the ICs recently generated public keyset and the IC manufacturer's digital signature (which hashes all of the other data in the token) is forwarded to the IC as well as to the escrow agent.

The application software of the IC uses a new command, for example, CGX_GEN_RKEK, to pass into the chip the signed token as an argument to the command. An additional argument is the public key component from the escrow agent.

The public key component from the escrow agent may be delivered directly from the escrow agent to the IC or may be routed through the trusted third party.

The chip checks the token's digital signature using a public key burned into the IC during manufacturing to verify the signature of the IC manufacturer, and further checks the serial number in the returned signed token to see if it matches that which has been burned into the chip during manufacturing. If both portions check out, then the token has been validated.

The RKEK is created by the chip from the escrow agent's public key component (which the chip now has) and the chip's private key component (which it has been holding onto). The same RKEK is also created by the escrow agent from its private key component, and the chip's public key component which it received from the chip either directly or through the chip manufacturer.

The ultimate RKEK which is created is the D-H shared secret, i.e., a modulo-exponentiation operation is performed using the other party's public key and the first party's private key (x or y). The result of this operation is a number that both parties will have, but which an eavesdropper cannot generate. This number becomes the RKEK.

As a result of this exchange of information, the chip now has the RKEK, which is stored in its key cache register, the escrow agent has the same RKEK which it saves, and the chip manufacturer or trusted third party has no RKEK because it was not privy to the private key components of the two other parties.

Alternatively, the escrow agent may choose to not generate the RKEK immediately, but rather to store the IC's public key so that it can generate the RKEK in the future should it be necessary.

The preferred integrated circuit uses many different keys, such as KEK's (key encryption keys), RKEK's, DEK's (data encryption keys), LSV's (local storage variables), and others. Each one of these keys has an attribute which identifies what type key it is and whether it is a trusted or untrusted key. The key management software of the IC reads these attributes and, therefore, recognizes the various keys, including the RKEK, and knows that it can use the RKEK as a key encryption key to encrypt other types of keys and allow them to be exported out of the chip.

The RKEK is used to "wrap" other keys which are used for data encryption, and the wrapped key may be exported with the encrypted data. Therefore, for exported encrypted data, if a receiver of the data cannot find the original encryption key, the key was exported with the data, and therefore, all the receiver needs is the RKEK. Accordingly, the RKEK may be used to encrypt data (by wrapping the encryption key) but also for decrypting data (by recovering the encryption key).

The preferred method of generating a recovery key encryption key (RKEK), in accordance with the present invention, is shown in the flow chart of the drawing and will now be described in detail. The integrated circuit (IC) is referred to in the flow chart by the trademark CryptIC, and the term "IRE" refers to the assignee and owner of the invention, Information Resource Engineering, Inc. IRE is the manufacturer of the integrated circuit and is the trusted third party in the operation of generating an RKEK.

In accordance with the preferred method, the first step in the process is to have the integrated circuit and the recovery agency generate a public key set. Preferably, as mentioned previously, a Diffie-Hellman (D-H) public key set is used. The steps involved in generating the D-H public key set are shown in the flow chart and labeled as Blocks 2–10.

First, the application software on the integrated circuit requests the serial number from the integrated circuit (Block 2). This is done with a command, such as CGX_GET_CHIPINFO. The next step is for the application software associated with the integrated circuit to transmit the serial number to the recovery agency (Block 4). This is done with a message, which is referred to as a "request" or "token".

Both the integrated circuit (perhaps under control of, the OEM manufacturer) and the recovery agency agree on a particular modulus "m" and generator "g", and the recovery agency returns its modulus and generator to the application software of the integrated circuit (Block 6). The recovery agency also generates a new D-H public key set (Block 8). Similarly, the integrated circuit uses the modulus "m" and the generator "g" to generate a D-H public key set (Block 10). This is usually done through a command by the application software, such as CGX_GEN_NEWPUBKEY.

The application software for the integrated circuit then constructs a key-recovery request token message and sends this message to the trusted third party (Block 12). The request token preferably includes the integrated circuit serial number, which is the unique number which is programmed into the integrated circuit, and the D-H public key of the integrated circuit. The trusted third party (for example, IRE, the manufacturer of the integrated circuit) signs the request token with its private signature key (i.e., a digital signature) and returns the token as a message to the integrated circuit (Block 16). This return token preferably includes the integrated circuit serial number, the D-H public key (of the integrated circuit) and the trusted third party's digital signature.

The recovery agency sends its public key to the integrated circuit application software (Block 14). Now, the integrated circuit has all that it needs to generate the RKEK.

The application software commands the integrated circuit to generate the RKEK (Block 18). It may do this with a command, such as CGX_GEN_RKEK. The CGX kernel (secure portion of the integrated circuit) parses the recovery token sent from the trusted third party (IRE) so that the trusted third party's digital signature and the serial number may be verified (Block 20). The integrated circuit then compares the serial number in the recovery token from the third party with its own serial number programmed in the chip to see if there is a match (Block 22). If the two serial numbers do not match, then the routine is aborted and the request to generate an RKEK is rejected (Block 24). If the serial numbers match, then the integrated circuit verifies whether the digital signature from the trusted third party is authentic by using a trusted public key which the integrated circuit has stored in memory (Block 26). If the digital signature is not authentic, then the routine is aborted and the request to generate an RKEK is rejected (Block 28). If the digital signatures match, then the integrated circuit will calculate an RKEK using the D-H algorithm (Block 30).

Similarly, the recovery agency calculates its copy of the same RKEK (Block 32). The recovery agency was sent the public key of the integrated circuit (Block 16) and, from this public key, and its private and public key, the recovery agency uses the Diffie-Hellman algorithm to generate the same RKEK at its end. The recovery agency then stores its RKEK along with the integrated circuit's serial number in escrow (Block 34).

A computer program showing the operation of the integrated circuit in generating the RKEK in accordance with the present invention is provided herewith and is incorporated herein as part of the disclosure of the invention.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A method of generating a recovery key encryption key (RKEK) in a secure manner by an integrated circuit and a key recovery escrow agent, which comprises the steps of:

generating by the integrated circuit a first number having a private component and a public component;

generating by the escrow agent a second number having a private component and a public component;

providing the public component of the first number to the escrow agent, thereby enabling access to the private component of the first number external to the integrated circuit to be denied;

providing the public component of the second number to the integrated circuit;

conducting a mathematical operation by the integrated circuit to create the RKEK; and conducting a mathematical operation by the escrow agent to create the RKEK.

2. A method of generating a recovery key encryption key (RKEK) in a secure manner by an integrated circuit and a key recovery escrow agent, the integrated circuit having a unique serial number stored in a memory of the integrated circuit, which comprises the steps of:

generating by the integrated circuit a first number having a private component and a public component;

generating by the escrow agent a second number having a private component and a public component;

retrieving by a third party the serial number of the integrated circuit and comparing the serial number with a serial number stored in a memory of the third party to verity the identity of the integrated circuit;

generating by the third party a message containing at least a digital signature of the third party authorizing the generation of the RKEK and communicating the message to the integrated circuit;

providing the public component of the second number to the integrated circuit; and conducting a Diffie-Hellman modulo-exponentiation mathematical operation by the integrated circuit to create the RKEK, thereby enabling access to the private component of the first number external to the integrated circuit to be denied.

3. A method of generating a recovery key encryption key (RKEK) as defined by claim 2, wherein the message generated by the third party and communicated to the integrated circuit further includes the serial number of the integrated circuit, and wherein the method further comprises the step of:

verifying by the integrated circuit the accuracy of the serial number included in the message by comparing the serial number of the message with the serial number stored in the memory of the integrated circuit.

4. A method of generating a recovery key encryption key (RKEK) as defined by claim 3, which further comprises the step of:

verifying by the integrated circuit the accuracy of the digital signature of the third party contained in the method.

5. A method of generating a recovery key encryption key (RKEK) as defined by claim 4, which further comprises the steps of:

providing the public component of the first number to the escrow agent; and conducting a Diffie-Hellman modulo-exponentiation mathematical operation by the escrow agent using the private component of the second number, and the public component of the first number to create the RKEK.

* * * * *